United States Patent
Yin et al.

(10) Patent No.: US 12,395,242 B2
(45) Date of Patent: Aug. 19, 2025

(54) OPTICAL TRANSPORT TERMINAL NODE ARCHITECTURE WITH FREE SPACE OPTICAL BACKPLANE

(71) Applicant: Microsoft Technology Licensing, LLC, Redmond, WA (US)

(72) Inventors: Yawei Yin, Redmond, WA (US); Binbin Guan, Issaquah, WA (US); Jamie Gaudette, Kirkland, WA (US); Denizcan Billor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 18/335,646

(22) Filed: Jun. 15, 2023

(65) Prior Publication Data
US 2024/0421902 A1    Dec. 19, 2024

(51) Int. Cl.
*H04B 10/11* (2013.01)
*H04B 10/80* (2013.01)

(52) U.S. Cl.
CPC ............ *H04B 10/11* (2013.01); *H04B 10/80* (2013.01)

(58) Field of Classification Search
None
See application file for complete search history.

(56) References Cited

U.S. PATENT DOCUMENTS

| | | | |
|---|---|---|---|
| 5,920,664 A | 7/1999 | Hirabayashi et al. | |
| 6,339,503 B1 * | 1/2002 | Derstine | G02B 3/0062 359/663 |
| 2004/0042798 A1 | 3/2004 | Kehr et al. | |
| 2006/0177184 A1 * | 8/2006 | Basavanhally | G02B 6/3897 385/88 |
| 2010/0296820 A1 | 11/2010 | Kuo et al. | |

FOREIGN PATENT DOCUMENTS

KR    100606085 B1    7/2006

OTHER PUBLICATIONS

Hashimoto, et al., "High-speed multispectral videography with a periscope array in a spectral shaper", Optics Letters, vol. 39, No. 24, Dec. 15, 2014, pp. 6942-6945.
International Search Report and Written Opinion received for PCT Application No. PCT/US2024/033479, Sep. 20, 2024, 14 pages.
Maggio, et al., "Free-space Optical Backplane Prototype for Telecommunication Equipment in the Petabit/s Range", In Bell Labs Technical Journal, vol. 18, Issue 3, Dec. 2013, pp. 285-291.

* cited by examiner

*Primary Examiner* — David W Lambert (57) ABSTRACT

Systems and methods are provided for implementing a free space optical backplane structure including a body and a plurality of mirrors. The body includes a chamber, a front panel, and a plurality of apertures disposed in the front panel, the plurality of apertures including a first set of apertures and a second set of apertures. The plurality of mirrors includes first and second arrays of mirrors mounted at first and second sets of heights, respectively, within the chamber, and is aligned with the first and second sets of apertures located in the front panel. The first and second arrays of mirrors are arranged to direct laser signals travelling through free space that are transmitted from or to a first device through the first set of apertures, between the first and second arrays of mirrors, and to or from a corresponding second device through the second set of apertures.

20 Claims, 7 Drawing Sheets

OPTICAL TRANSPORT TERMINAL NODE ARCHITECTURE WITH FREE SPACE OPTICAL BACKPLANE

BACKGROUND

Internet traffic is growing at an unprecedented rate, generated largely by cloud computing, gaming, and smart devices. High capacity and low latency data links, both within and among data centers will be required in strategic sections of communications networks (e.g., in an optical layer of the networks). It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for a free space optical backplane structure including a body and a plurality of mirrors. The body includes a chamber, a front panel, and a plurality of apertures disposed in the front panel, the plurality of apertures including a first set of apertures and a second set of apertures. The plurality of mirrors includes a first array of mirrors mounted at a first set of heights within the chamber and a second array of mirrors mounted at a second set of heights within the chamber. The first set of apertures is located in the front panel at the first set of heights and is aligned with the first array of mirrors, while the second set of apertures is located in the front panel at the second set of heights and is aligned with the second array of mirrors. The first and second arrays of mirrors are arranged to direct laser signals travelling through free space that are transmitted from or to a first device through the first set of apertures, between the first array of mirrors and the second array of mirrors, and to or from a corresponding second device through the second set of apertures. The free space optical backplane structure, together with the first and second devices (e.g., at least one optical transponder node and an optical transport multiplexer/demultiplexer ("mux/demux") node), forms an optical transport terminal node.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

As briefly discussed above, an optical node architecture is provided that utilizes free space optical ("FSO") technology as a backplane to connect transponder nodes or line-cards with a multiplexer/demultiplexer ("mux/demux") node or line-card to form an optical transport terminal node for metropolitan (or metro) area and long-haul optical signal transmissions. The optical node architecture leaves zero front panel fiber connectivity between each transponder node or line-card and the mux/demux node or line-card, which significantly reduces room for human errors during optical transport system turn up and operation.

In examples, an optical transport terminal node includes at least one optical transponder node, an optical transport mux/demux node, and a FSO backplane structure. The optical transport mux/demux node includes a hollow core optical fiber interface, a backplane interface configured to direct laser signals to or from the at least one optical transponder node via a rear panel and via the FSO backplane structure, a mux, and a demux. The mux is configured to multiplex multiple sets of laser signals from the at least one optical transponder node via the backplane interface into a single set of laser signals for transmission through a first hollow core optical fiber via the hollow core optical fiber interface. The demux, in contrast, is configured to demultiplex a single set of laser signals received from a second hollow core optical fiber via the hollow core optical fiber interface into multiple sets of laser signals for relay to the at least one optical transponder node via the backplane interface. The FSO backplane structure includes a body and a plurality of mirrors. The body includes a chamber, a front panel, and a plurality of apertures disposed in the front panel, the plurality of apertures including a first set of apertures and a second set of apertures. The plurality of mirrors includes a first array of mirrors mounted at a first set of heights within the chamber and a second array of mirrors mounted at a second set of heights within the chamber. The first set of apertures is located in the front panel at the first set of heights, is aligned with the first array of mirrors, and is aligned with the optical transport mux/demux node. The second set of apertures is located in the front panel at the second set of heights, is aligned with the second array of mirrors, and is aligned with the at least one optical transponder node. The first and second arrays of mirrors are arranged to direct laser signals travelling through free space that are transmitted from or to the optical transport mux/demux node through the first set of apertures, between the first array of mirrors and the second array of mirrors, and to or from the at least one optical transponder node through the second set of apertures.

With the use of hollow-core fibers and the FSO backplane, higher laser power may be used to improve signal to noise characteristics, while also enabling longer distance signal transmission without use of signal repeaters. With an air core (or a vacuum core) instead of a solid glass core, hollow-core optical fibers can be operated at higher laser power, whereas such higher laser power may potentially burn solid core optical fibers. Non-linearities (e.g., due to photons interacting with silicon atoms of solid core optical fibers) are also avoided with the use of hollow-core fibers and the FSO backplane.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-6 illustrate some of the features of a system and apparatus for implementing hollow core fiber optic communication system, and, more particularly, to systems and apparatuses for implementing optical transport terminal node architecture with free space optical backplane, as referred to above. The systems and apparatuses illustrated by FIGS. 1-6 refer to examples of different embodiments that include various components and steps, which can be considered alternatives or which can be used in conjunction with one another in the various embodiments. The description of the illustrated systems and apparatuses shown in FIGS. 1-6 is provided for purposes of illustration and should not be considered to limit the scope of the different embodiments.

Figure 1:
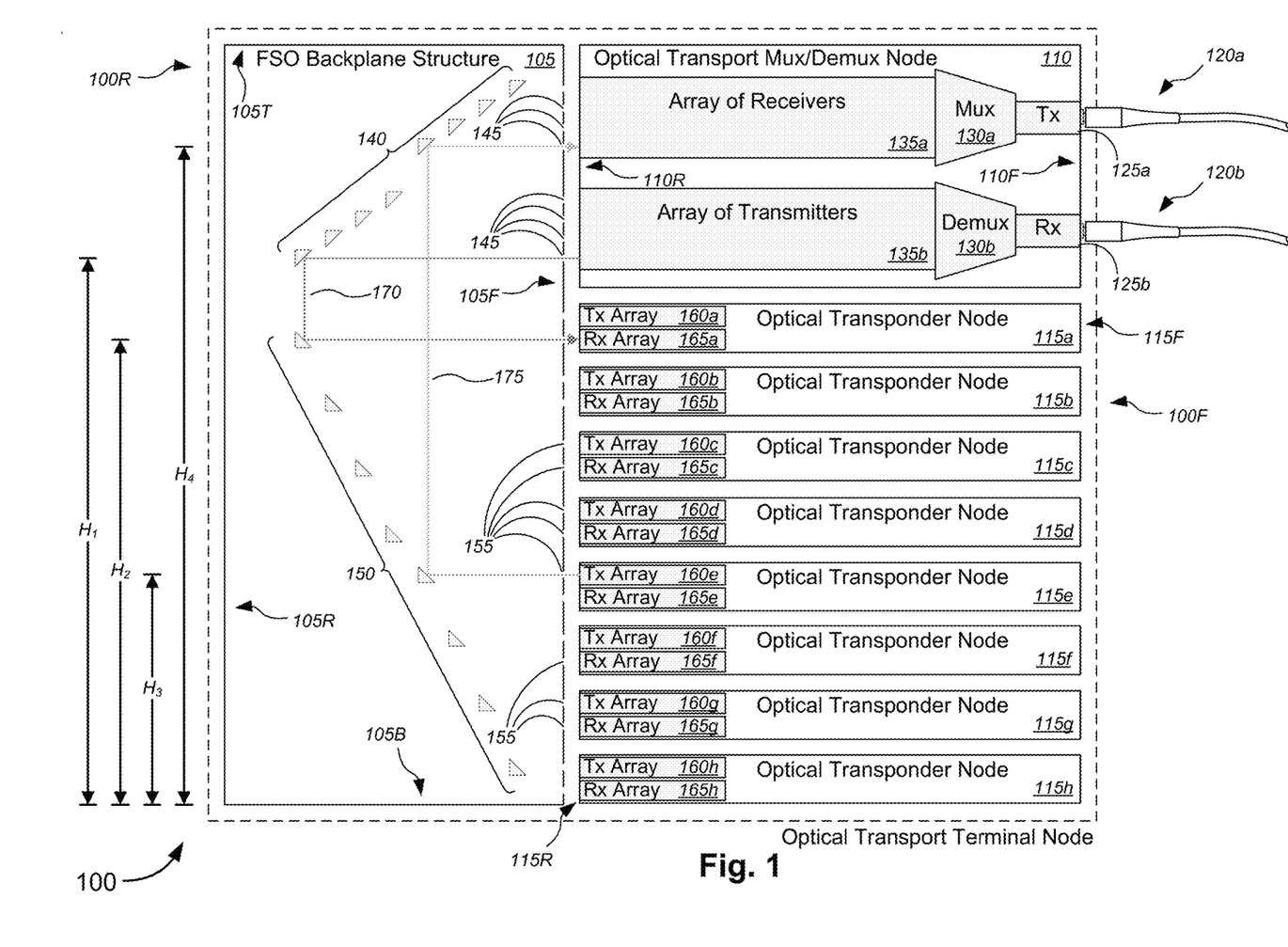
FIG. 1 depicts an example optical transport terminal node.

FIG. 1 depicts an example optical transport terminal node 100. Example optical transport terminal node 100 as presented is a combination of interdependent components that interact to form an integrated whole. For instance, in FIG. 1, optical transport terminal node 100 includes FSO backplane structure 105, optical transport mux/demux node 110, and one or more optical transponder nodes 115a-115h (collectively, "optical transponder nodes 115"). As shown in FIG. 1, a front panel or front surface 105F of the FSO backplane structure 105 faces, interfaces, abuts, and/or makes contact with one or more of a rear panel or rear surface 110R of the optical transport mux/demux node 110 or a rear panel or rear surface 115R of each optical transponder node 115.

On a front panel or front surface 110F of the optical transport mux/demux node 110, one or more optical fiber cables 120 may be inserted into one or more optical ports 125. In examples, a first hollow-core optical fiber cable 120a is inserted into an optical transmitter port 125a, while a second hollow-core optical fiber cable 120b is inserted into an optical receiver port 125b. A hollow-core optical fiber cable, as used herein, refers to an optical fiber cable having a hollow core (or air core or vacuum core) instead of a solid core of glass. Hollow-core optical fiber enable increased overall speed and lower latency as light travels through the hollow-core optical fiber cable faster than through silica glass of solid core optical fiber cables. Hollow-core optical fiber also reduces, minimizes, or eliminates fiber non-linearities (in which photons interact with silicon atoms of glass cores) and has a broader spectrum, thus lowering costs and increasing bandwidth and enhancing network quality. Hollow-core optical fiber may also allow for ultra-low signal loss enabling deployment over longer distances without repeaters. With an air core (or a vacuum core) instead of a solid glass core, hollow-core optical fibers can be operated at higher laser power, where such higher laser power may potentially burn solid core optical fibers. Higher laser power enables improved signal to noise characteristics, while also enabling longer distance signal transmission without use of signal repeaters.

The optical transport mux/demux node 110 further includes a mux 130a, a demux 130b, an array of receivers 135a, and an array of transmitters 135b. The mux 130a is configured to multiplex multiple sets of laser signals received by the array of receivers 135a (at a rear panel or surface 110R) from the at least one optical transponder node 115 via the FSO backplane structure 105 into a single set of laser signals for transmission through the first hollow core optical fiber cable 120a via hollow core optical fiber interface (e.g., optical transmitter port 125a). The demux 130b, in contrast, is configured to demultiplex a single set of laser signals received from the second hollow core optical fiber cable 120b via the hollow core optical fiber interface (e.g., optical receiver port 125b) into multiple sets of laser signals for relay via the array of transmitters 135b (at the rear panel or surface 110R) to the at least one optical transponder node 115 via the FSO backplane structure 105. In some examples, each transmitter of the array of transmitters 135b collimates and focuses the FSO laser signal into the FSO backplane structure 105 (e.g., toward the plurality of mirrors therein).

The FSO backplane structure 105 includes a body and a plurality of mirrors 140, 150. The body includes a chamber, a front panel 105F, and a plurality of apertures 145, 155 disposed in the front panel 105F, the plurality of apertures 145, 155 including a first set of apertures 145 and a second set of apertures 155. In some examples, the body further includes a rear panel 105R, a top panel 105T, a bottom panel 105B, and side panels 105S (which is shown in FIGS. 2A, 2C, 3A, 4A, and 6). The chamber is defined by the front panel 105F, the rear panel 105R, the top panel 105T, the bottom panel 105B, and the side panels 105S. The plurality of mirrors 140, 150 includes a first array of mirrors 140 mounted at a first set of heights within the chamber and a second array of mirrors 150 mounted at a second set of heights within the chamber. The first set of apertures 145 is located in the front panel 105F at the first set of heights, is aligned with the first array of mirrors 140, and is aligned with the optical transport mux/demux node 110. The second set of apertures 155 is located in the front panel 105F at the second set of heights, is aligned with the second array of mirrors 150, and is aligned with the at least one optical transponder node 115. The first and second arrays of mirrors 140, 150 are arranged to direct laser signals travelling through free space that are transmitted from or to the optical transport mux/demux node 110 through the first set of apertures 145, between the first array of mirrors 140 and the second array of mirrors 150, and to or from the at least one optical transponder node 115 through the second set of apertures 155.

Each optical transponder node 115 includes a transmitter array 160 and a receiver array 165. As shown in FIG. 1, optical transponder node 115a includes transmitter array 160a and receiver array 165a, while optical transponder node 115b includes transmitter array 160b and receiver array 165b, and optical transponder node 115c includes transmitter array 160c and receiver array 165c, and so on. Transmitter array 160 and receiver array 165 are located at a rear panel or surface 115R. With the FSO backplane implementation, connection of fiber connections between the optical transport mux/demux node 110 and at least one optical transponder node 115 on their respective front panels or surfaces 110F and 115F is obviated. In this manner, errors (e.g., human error) during optical transport system turn up and operation are significantly reduced.

In an example, a first laser signal carried by hollow-core optical fiber cable 120b is input into optical receiver port 125b of the optical transport mux/demux node 110. After demultiplexing operations by demux 130b, the first laser signal is transmitted (and in some cases, collimated and focused) by at least one transmitter among the array of transmitters 135b through an aperture 145 to be directed by a mirror 140 (at height $H_1$) to a mirror 150 (at height $H_2$) along FSO path 170, through an aperture 155 into at least one receiver among the receiver array 165a of optical transponder node 115a.

In another example, a second laser signal is transmitted (and in some cases, collimated and focused) by at least one transmitter among the transmitter array 160e of optical transponder node 115e through an aperture 155 to be directed by a mirror 150 (at height $H_3$) to a mirror 140 (at height $H_4$) along FSO path 175, through an aperture 145 into at least one receiver among the array of receivers 135a. Signals from the array of receivers 135a (including the second laser signal) are multiplexed by mux 130a and output via optical transmitter port 125a and carried by hollow-core optical fiber cable 120a.

Although hollow-core optical fiber cables are described herein as being used with the optical transport terminal node, solid core optical fiber cables can also be used in conjunction with the FSO backplane structure 105, where arrays of receivers and transmitters convert between solid core fiber signal transmission and FSO signal transmission. Also, although the heights are referred to herein as being relative to a bottom panel 105B of the FSO backplane structure, the heights may be in relation to any suitable point of reference either within, on, or external to the FSO backplane structure 105.

Figure 2A:
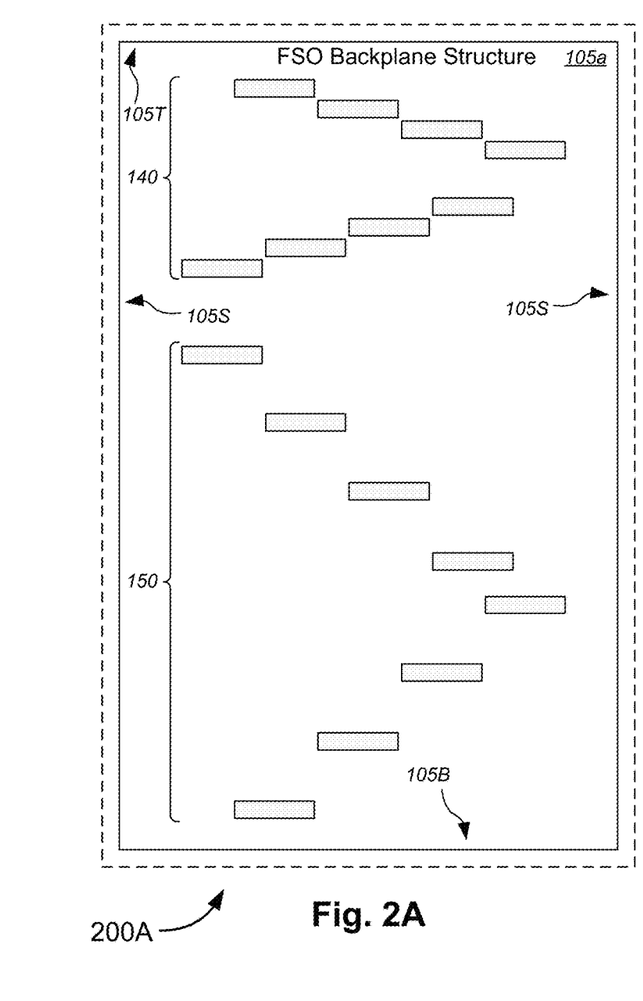
FIGS. 2A-2D depict various example optical transport terminal nodes that include various example free space optical ("FSO") backplane structures having different mirror configurations.
Figure 2B:
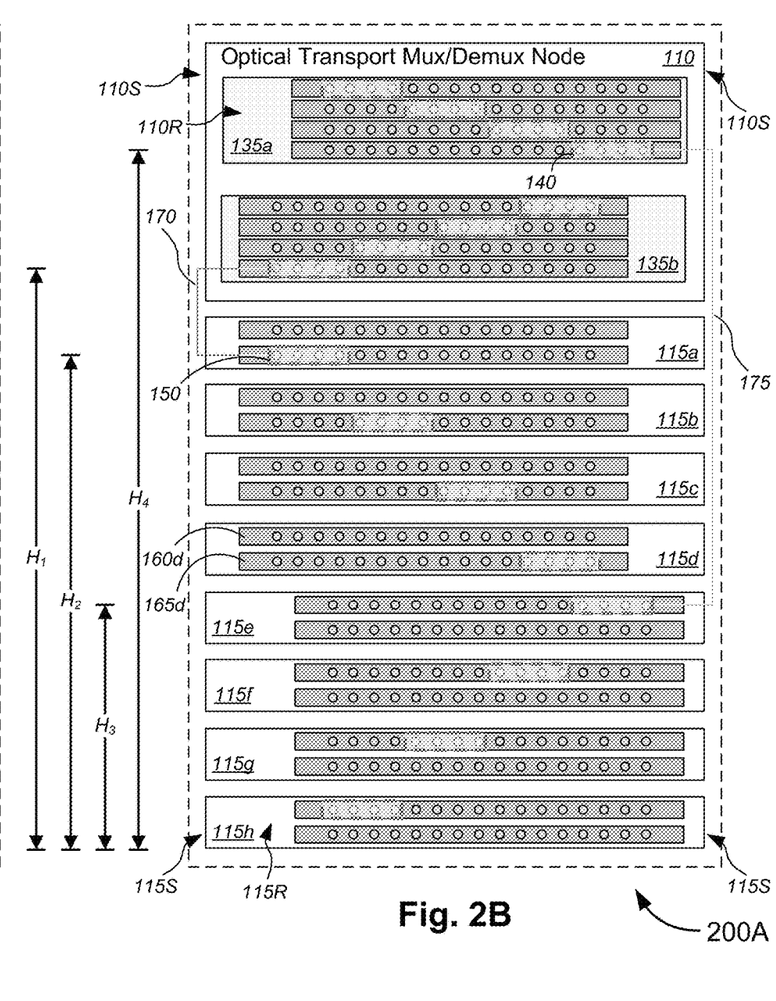
Figure 2C:
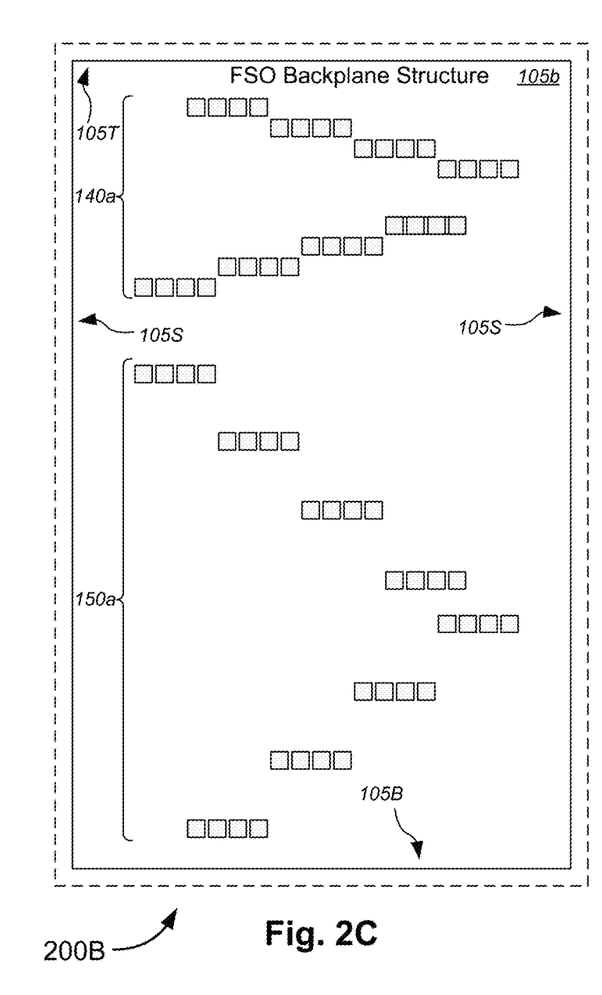
Figure 2D:
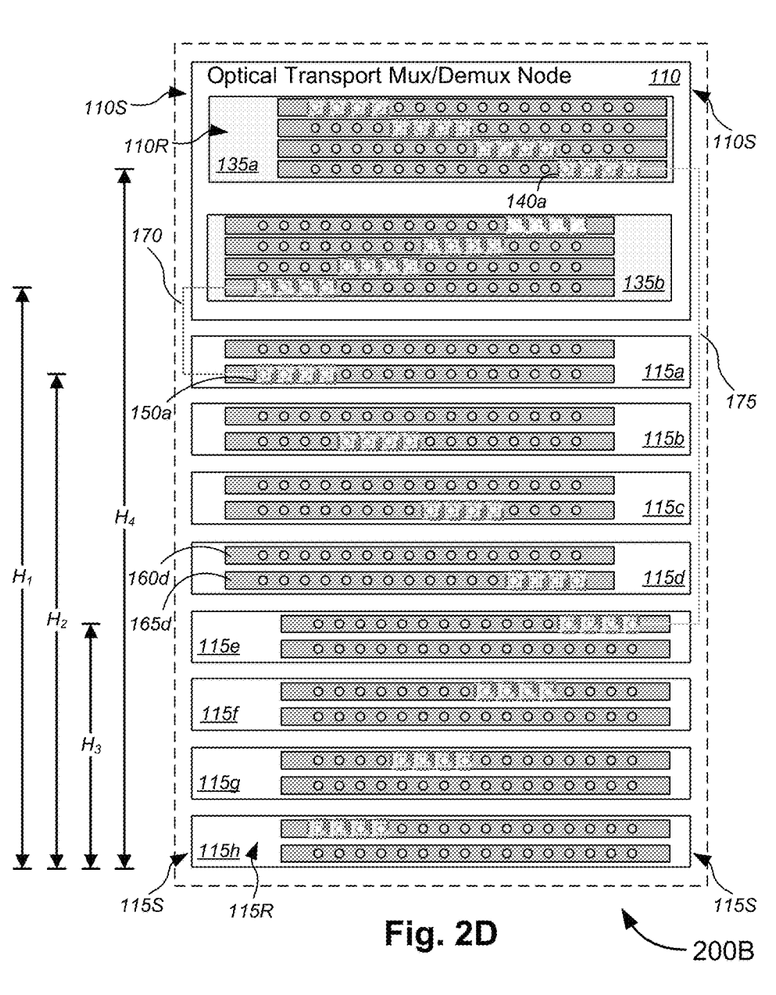

FIGS. 2A-2D depict various example optical transport terminal nodes 200A and 200B that include various example FSO backplane structures 105a and 105b having different mirror configurations. FIGS. 2A-2D are depicted as schematic cut-out views of the FSO backplane structure 105a (FIG. 2A) or 105b (FIG. 2C) and the optical transport mux/demux node 110 and optical transponder nodes 115 (FIGS. 2B and 2D). FIGS. 2A and 2B (and FIGS. 2C and 2D) depict the relative positions of example arrays of mirrors 140, 150 (or example arrays of mirrors 140a, 150a) in relation to transmitter/receiver arrays 135b/135a of the optical transport mux/demux node 110 and in relation to transmitter/receiver arrays 160/165 of the optical transponder nodes 115. FIGS. 2A and 2B depict single mirrors spanning multiple transmitters/receivers (e.g., solid lined rear outline of mirrors 140 and 150 in FIG. 2A; dash lined rear outline of mirrors 140 and 150 in FIG. 2B). In contrast, FIGS. 2C and 2D depict mirror arrays with each mirror in each array spanning a single transmitter/receiver (e.g., solid lined rear outline of mirrors 140a and 150a in FIG. 2C; dash lined rear outline of mirrors 140a and 150a in FIG. 2D). The example optical transport terminal nodes 200A and 200B are otherwise similar, and operate in a similar manner, as described above with respect to the example optical transport terminal node 100 of FIG. 1.

Although optical transponder nodes 115 are depicted as either used as a receiver or as a transmitter (relative to the FSO backplane structure 105a or 105b), based on positioning of mirrors (e.g., mirrors 140, 150, 140a, and 150a), this is merely for simplicity of illustration. The optical transponder nodes may be operated in either receiver mode, transmitter mode, or both (in some cases, concurrently). Similarly, although only some of the transmitters and receivers are shown to be aligned a mirror or mirror array while others are not so aligned, this is also for simplicity of illustration. Each transmitter and each receiver may be aligned with a mirror or mirror array that is aligned to direct laser light to or from the corresponding receiver or transmitter int eh optical transport mux/demux node 110. To avoid crosstalk or intersection between laser signals, the mirrors (and corresponding transmitters/receivers) may be offset from each other horizontally and/or vertically within the body or chamber of the FSO backplane structure 105a, as partially shown in FIGS. 2A-2D.

Figure 3A:
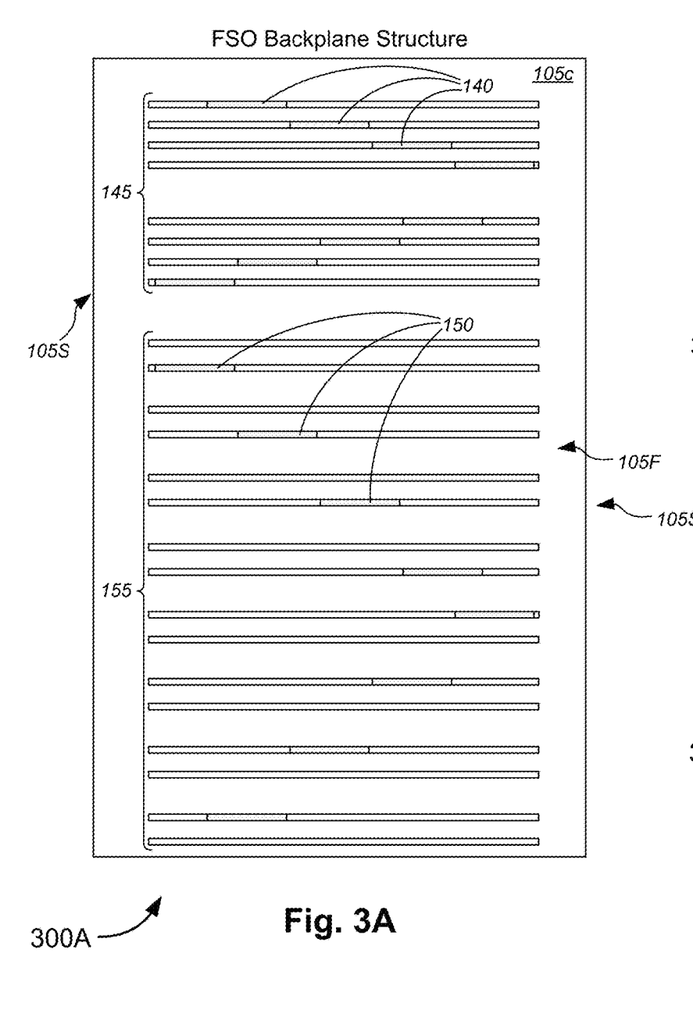
FIGS. 3A-3E depict various example FSO backplane structures including apertures and related components.

FIGS. 3A-3E depict various example FSO backplane structures 105c-105e including apertures and related components. In some examples, apertures 145, 155 are provided in the front panel or front surface 105F of an FSO backplane structure 105, such as FSO backplane structure 105c, e.g., as shown in the example implementation 300A of FIG. 3A. The apertures 145, 155 of FSO backplane structure 105c are depicted in FIG. 3A as horizontal openings in the front panel 105F, the horizontal openings being parallel to each other spanning from top to bottom. As shown in FIG. 3A, mirrors 140, 150 may be visible when looking through the apertures 145, 155. Although apertures 140, 150 are depicted as horizontal openings spanning across a substantial portion of the width of the FSO backplane structure, apertures 145, 155 may instead be embodied as polygonal openings spanning one or more mirrors along a horizontal direction within the FSO backplane structure. In some examples, the polygonal openings include circular openings, triangular openings, square openings, rhombic openings, rectangular openings, parallelogram-shaped openings, trapezoidal openings, pentagonal openings, hexagonal openings, or other polygonal-shaped openings. The apertures 140, 150 may also extend vertically, diagonally, or in other patterns, instead of horizontally.

Figure 3B:
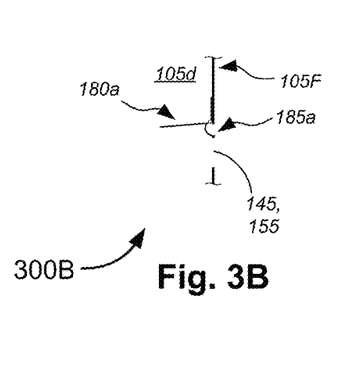
Figure 3C:
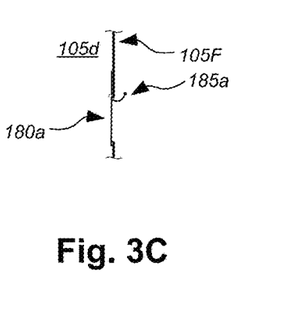

To limit dust entering the FSO backplane structure 105, shutters may be used to cover the apertures 140, 150 when not interfaced and/or in use with the optical transport mux/demux node 110 and/or the optical transponder nodes 115. Dust within the FSO backplane structure may affect FSO transmission of the laser signals, in some cases, adding noise, causing scattering, and/or reducing the signal power. FIGS. 3B and 3C depict one example implementation 300B, in which a (hinge-based) shutter 180a is implemented (in some cases, in conjunction with a fixed push-bar-based interlock system 185a). As shown in FIG. 3B, when the interlock system 185a is pushed, such as when another device (e.g., optical transport mux/demux node 110 or a transponder node 115) is positioned in place to face, interface, abut, and/or make contact with the front panel 105F of the FSO backplane structure (in this case, FSO backplane structure 105d), the shutter 180a is pushed upward to expose the aperture 145, 155. As shown in FIG. 3C, when the interlock system 185a is not engaged (e.g., by another device), the shutter 180a falls (e.g., due to gravitation force) to cover the aperture 145, 155.

Figure 3D:
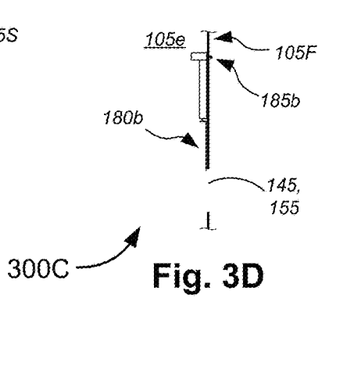
Figure 3E:
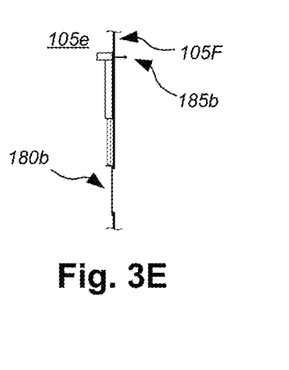

FIGS. 3D and 3E depict another example implementation 300C, in which a (solenoid-based) shutter 180b is implemented (in some cases, in conjunction with a pin-based interlock system 185b). As shown in FIG. 3D, when the interlock system 185b is pushed inward in through the front panel 105F of the FSO backplane structure (in this case, FSO backplane structure 105e), such as when another device (e.g., optical transport mux/demux node 110 or a transponder node 115) is positioned in place to face, interface, abut, and/or make contact with the front panel 105F of the FSO backplane structure, the shutter 180b is actuated. When actuated, the solenoid-based shutter 180b causes a shaft to pull upward. Because the shaft is attached or fixed to a portion of a shutter flap, pulling the shaft upward causes the attached shutter flap to move upward, thereby exposing the aperture 145, 155. As shown in FIG. 3E, when the interlock system 185b is not engaged (e.g., by another device), the solenoid-based shutter 180b causes the shaft to extend downward, causing the attached shutter flap to also extend downward, thereby covering the aperture 145, 155. The interlock system 185b may also be spring-loaded such as to bias in the extended pin position (as shown in FIG. 3E); pushing against the spring-loaded mechanism causes opening of the shutter (as shown in FIG. 3D).

The shutter system also serves as a safety feature that prevents laser light from entering and reflecting from the mirrors when not properly positioned and aligned with the FSO backplane structure, laser light being damaging to eyes and skin of people and animals in the vicinity. Although particular mechanical and/or electro-mechanical are depicted and described above with respect to implementations of shutters, any suitable shutter implementation may be used, including simple mechanical (such as a push-bar type as shown in FIGS. 3B and 3C), complex mechanical (e.g., using springs, levers, etc. (not shown)), electro-mechanical (e.g., using motor-based systems (not shown)), or electro-magnetic (such as the solenoid-based push-pull system as shown in FIGS. 3D and 3E, or other electro-magnetic systems (not shown)).

Figure 4A:
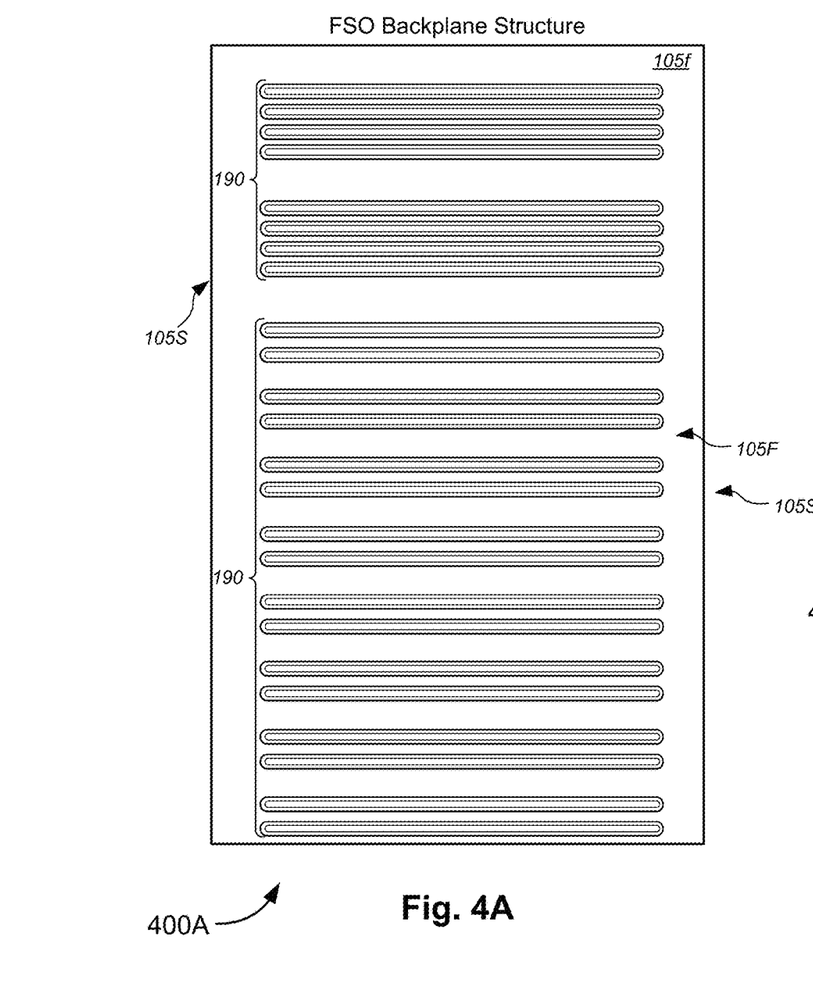
FIGS. 4A-4C depict various example FSO backplane structures including optical windows and related components.
Figure 4B:
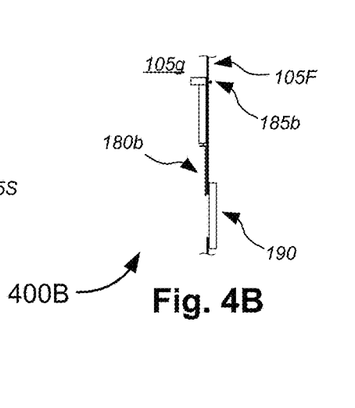
Figure 4C:
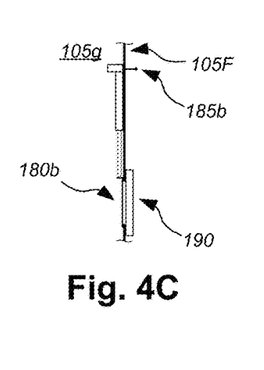

FIGS. 4A-4C depict various example FSO backplane structures 105f and 105g including optical windows and related components. In some embodiments, the chamber of the FSO backplane structure (such as FSO backplane structure 105f of the example implementation 400A of FIG. 4A) is hermetically sealed, with a plurality of optical windows 190 covering the apertures 145, 155. In some examples, the plurality of optical windows is configured for high power laser transmission, and thus will not burn like conventional solid core optical fiber. In examples, the hermetically sealed chamber is one of filled with air, filled with an inert gas, filled with an inert gas mixture, or vacuum pumped.

With a hermetically sealed chamber, dust in the FSO backplane structure is of lesser concern, and shutters 180 may still be used for purposes of safety as described above with respect to FIGS. 3A-3E. In examples, the solenoid-based shutter system 180b of FIGS. 3D and 3E may be used in a similar manner a FSO backplane structure 105g having optical windows 190, as shown in FIGS. 4B and 4C. Other suitable shutter systems that do not breach the hermetic seal of the chamber may alternatively be used.

Figure 5A:
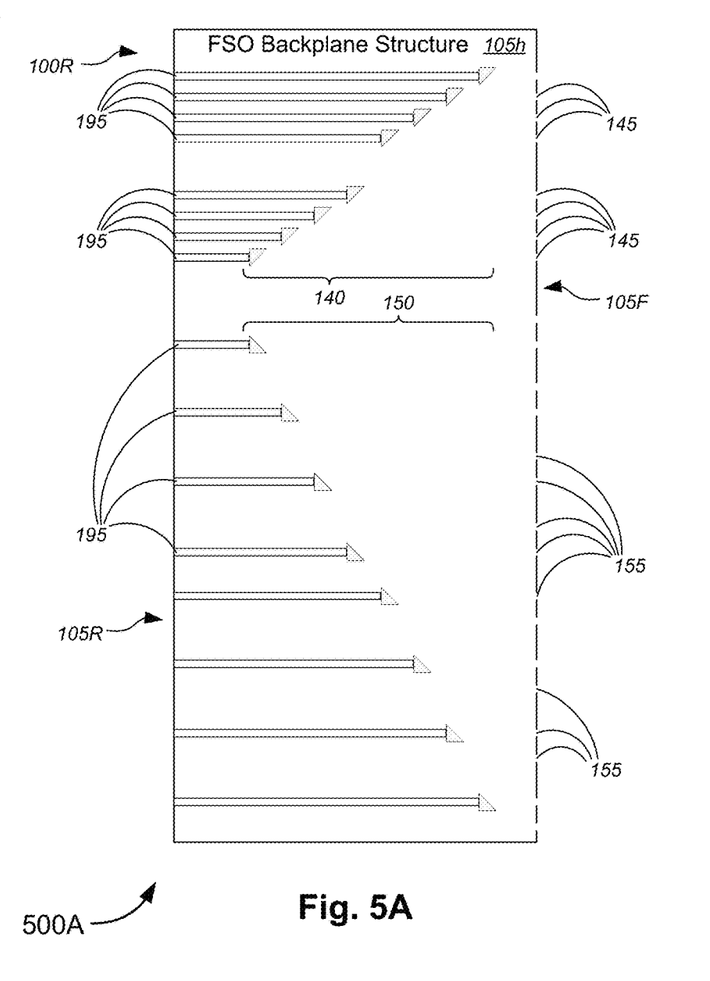
FIGS. 5A-5D depict various example FSO backplane structures including fixed and adjustable mounts for the mirrors.
Figure 5B:
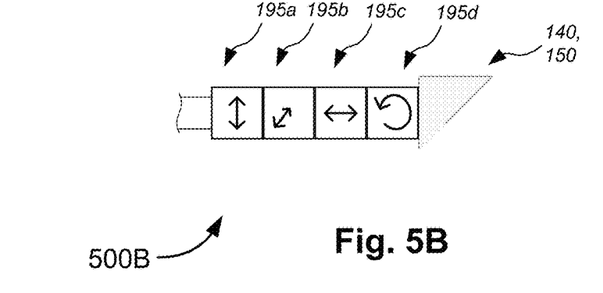
Figure 5C:
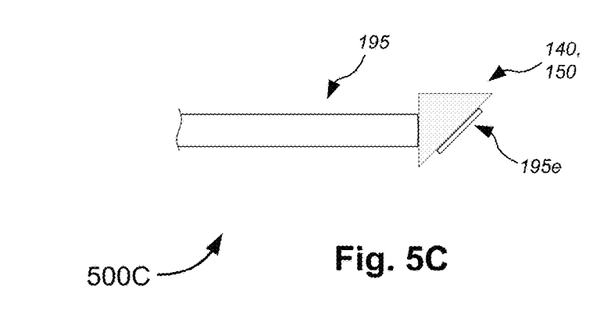
Figure 5D:
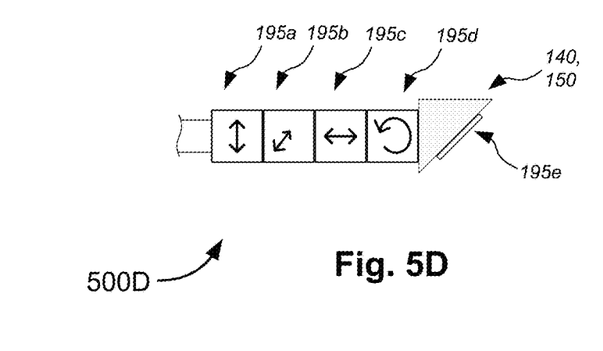

FIGS. 5A-5D depict various example FSO backplane structures 105h including fixed and adjustable mounts for the mirrors. As shown in the example implementation 500A of FIG. 5A, the plurality of mirrors 140, 150 is mounted within the chamber. Mounting of the mirrors 140, 150 either may be in fixed positions or may be adjustable. In examples, a fixed mount is set and aligned at time of assembly of the FSO backplane structure. Alternatively, runtime adjustable mountings or pre-runtime adjustable mountings may be used. In some examples, the plurality of mirrors 140, 150 is mounted within the chamber using adjustable mounts configured to adjust position (e.g., vertically along a z-axis direction 195a, laterally along a side-to-side y-axis direction 195b, and/or laterally along a back-to-front x-axis direction 195c), orientation (e.g., tilting upward or downward 195d), or a combination of position and orientation of each mirror or each array of mirrors. In examples, the adjustable mounts include one of micro-electromechanical system ("MEMS")-based adjustable mirror mounts (e.g., MEMS system 195e), stepper motor-based adjustable mirror mounts, servomotor-based adjustable mirror mounts, or mechanical adjustable mirror mounts. In some cases, the mount adjustment systems 195a, 195b, 195c, and/or 195d may be implemented using stepper motor-based adjustable mirror mounts, servomotor-based adjustable mirror mounts, or mechanical adjustable mirror mounts (collectively, "macro-adjustable mounts"). In some examples, the mirrors 140, 150 are mounted using macro-adjustable mounts, as shown in FIG. 5B. In other examples, the mirrors 140, 150 are mounted using MEMS-based adjustable mirror mounts, as shown in FIG. 5C. In yet other examples, the mirrors are mounted using a combination of macro-adjustable mounts and MEMS-based adjustable mirror mounts, as shown in FIG. 5D.

In examples, the plurality of mirrors each has a coating including at least one of an antireflective coating, a metal coating, a metal alloy coating, a dielectric coating, or a metal-dielectric coating. Each of these coatings provides characteristics for directing the laser signals using the coated mirrors 140, 150. Although particular fixed and adjustable mount configurations and types are shown and described with respect to FIGS. 5A-5D, any suitable type of fixed or adjustable mount configurations and types may be used.

Figure 6:
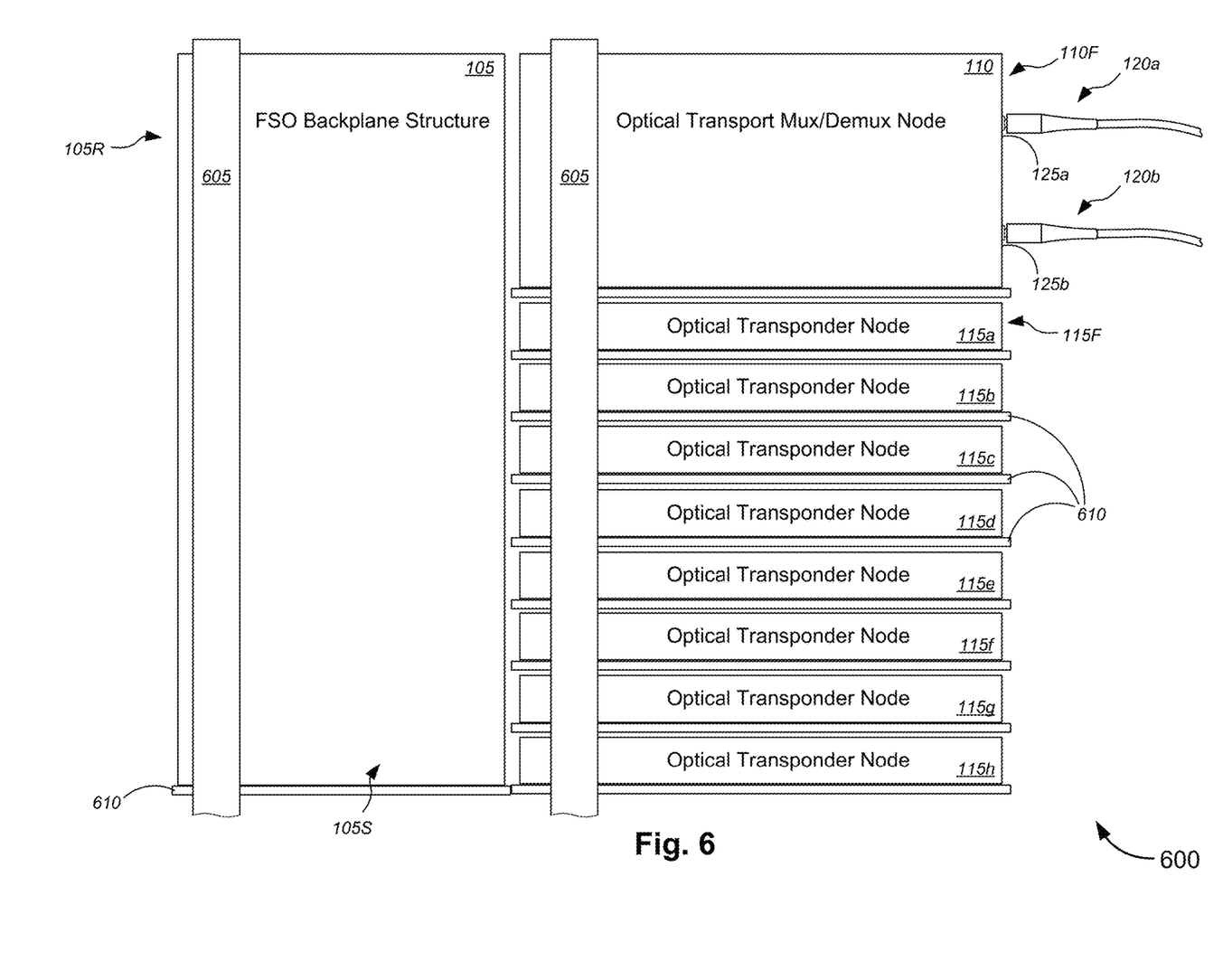
FIG. 6 depicts an example telecommunications equipment mounting structure that can be used for mounting components of the example optical transport terminal node of FIG. 1.

FIG. 6 depicts an example telecommunications equipment mounting structure 600 that can be used for mounting components of the example optical transport terminal node 100 of FIG. 1. As shown in FIG. 6, each of the FSO backplane structure 105, the optical transport mux/demux node 110, and the plurality of optical transponder nodes 115 may be mounted on a telecommunications equipment mounting structure 600, either directly to posts 605 or indirectly to shelves 610 that are mounted on posts 605. The telecommunications equipment mounting structure 600 may be disposed or located within a data center. Communications via the hollow-core fiber optical transport system may be implemented within the data center or between the data center and another data center.

As should be appreciated from the foregoing, the present technology provides multiple technical benefits and solutions to technical problems. For instance, establishing communications within a data center or between data centers generally raises multiple technical problems. For instance, use of solid core fiber optic cables for establishing such communications limits laser power that can be used. Higher laser power improves signal-to-noise characteristics, but too high a power results in burning of the solid core glass of the solid core fiber optic cables. The solid core may also result in non-linearity due to photons interacting with silicon atoms. The present technology provides an optical node architecture that utilizes FSO technology as a backplane to connect transponder nodes with a mux/demux node to form an optical transport terminal node for metro area and long-haul optical signal transmissions. This optical node architecture is compatible with FSO-based hollow-core fiber optic cables that (unlike solid core fiber optic cables) are not susceptible to burning at high laser power or non-linearity issues faced by solid core fiber optic cable systems.

In an aspect, the technology relates to a free space optical backplane structure, which includes a body and a plurality of mirrors. The body includes a chamber, a front panel, and a plurality of apertures disposed in the front panel, the plurality of apertures including a first set of apertures and a second set of apertures. The plurality of mirrors includes a first array of mirrors mounted at a first set of heights within the chamber and a second array of mirrors mounted at a second set of heights within the chamber. The first set of apertures is located in the front panel at the first set of heights and is aligned with the first array of mirrors. The second set of apertures is located in the front panel at the second set of heights and is aligned with the second array of mirrors. The first array of mirrors and the second array of mirrors are arranged to direct laser signals travelling through free space that are transmitted from or to a first device: (a) through the first set of apertures, (b) between the first array of mirrors and the second array of mirrors, and (c) to or from a corresponding second device through the second set of apertures.

In some examples, the laser signals travel horizontally through each of the first set of apertures and the second set of apertures, while the laser signals travel vertically between the first array of mirrors and the second array of mirrors. In examples, the body further includes a rear panel, a top panel, a bottom panel, and side panels, and the chamber is defined by a space enclosed by the front, rear, top, bottom, and side panels.

In some examples, the plurality of apertures includes a plurality of openings. The free space optical backplane structure further includes a plurality of aperture shutters mounted on the front panel. The plurality of aperture shutters is configured to open when the first device and the corresponding second device interface with at least a portion of the free space optical backplane structure, thereby allowing the laser signals to pass through the openings of the apertures. The plurality of aperture shutters is further configured to close over the plurality of openings when at least one of the first device or the corresponding second device fails to interface with the at least a portion of the free space optical backplane structure. In some cases, the free space optical backplane structure further includes a plurality of interlock switches that causes the plurality of aperture shutters to close over the plurality of openings when the at least one of the first device or the corresponding second device fails to interface with the at least a portion of the free space optical backplane structure. In an example, the first device includes an optical transport mux/demux node, while the second device includes one or more optical transponder nodes.

In examples, the plurality of apertures includes a plurality of optical windows, and the chamber is hermetically sealed. In some cases, the plurality of optical windows is configured for high power laser transmission. In some examples, the hermetically sealed chamber is one of filled with air, filled with an inert gas, filled with an inert gas mixture, or vacuum pumped.

In some examples, the plurality of mirrors is mounted in fixed positions within the chamber. In some cases, the plurality of mirrors is mounted within the chamber using adjustable mounts configured to adjust position, orientation, or a combination of position and orientation of each mirror or each array of mirrors. In some instances, the adjustable mounts include one of MEMS-based adjustable mirror mounts, stepper motor-based adjustable mirror mounts, servomotor-based adjustable mirror mounts, or mechanical adjustable mirror mounts. In some examples, the plurality of mirrors each has a coating including at least one of an antireflective coating, a metal coating, a metal alloy coating, a dielectric coating, or a metal-dielectric coating.

In another aspect, the technology relates to an optical transport terminal node, including at least one optical transponder node, an optical transport mux/demux node, and a free space optical backplane structure. The optical transport mux/demux node includes a hollow core optical fiber interface, a rear panel, a backplane interface, a mux, and a demux. The backplane interface is configured to direct laser signals to or from the at least one optical transponder node via the rear panel and via the free space optical backplane structure. The mux is configured to multiplex multiple sets of laser signals from the at least one optical transponder node via the backplane interface into a single set of laser signals for transmission through a first hollow core optical fiber via the hollow core optical fiber interface. The demux is configured to demultiplex a single set of laser signals received from a second hollow core optical fiber via the hollow core optical fiber interface into multiple sets of laser signals for relay to the at least one optical transponder node via the backplane interface. The free space optical backplane structure includes a body and a plurality of mirrors. The body includes a chamber, a front panel, and a plurality of apertures disposed in the front panel, the plurality of apertures including a first set of apertures and a second set of apertures. The plurality of mirrors includes a first array of mirrors mounted at a first set of heights within the chamber and a second array of mirrors mounted at a second set of heights within the chamber. The first set of apertures is located in the front panel at the first set of heights, is aligned with the first array of mirrors, and is aligned with the optical transport mux/demux node. The second set of apertures is located in the front panel at the second set of heights, is aligned with the second array of mirrors, and is aligned with the at least one optical transponder node. The first array of mirrors and the second array of mirrors are arranged to direct laser signals travelling through free space that are transmitted from or to the optical transport mux/demux node: (a) through the first set of apertures, (b) between the first array of mirrors and the second array of mirrors, and (c) to or from the at least one optical transponder node through the second set of apertures.

In some examples, the optical transport mux/demux node further includes a first set of transceivers configured to collimate laser signals into the chamber of the free space optical backplane structure when relaying the laser signals from the optical transport mux/demux node to the at least one optical transponder node. The at least one optical transponder node each includes a second set of transceivers configured to collimate laser signals into the chamber of the free space optical backplane structure when relaying the laser signals from the at least one optical transponder node to the optical transport mux/demux node.

In examples, the plurality of apertures includes a plurality of openings. the free space optical backplane structure further includes a plurality of aperture shutters mounted on the front panel. The plurality of aperture shutters is configured to open when the first device and the corresponding second device interface with at least a portion of the free space optical backplane structure, thereby allowing the laser signals to pass through the openings of the apertures. The free space optical backplane structure further includes a plurality of interlock switches that causes the plurality of aperture shutters to close over the plurality of openings when at least one of the first device or the corresponding second device fails to interface with the at least a portion of the free space optical backplane structure.

In some examples, the plurality of apertures includes a plurality of optical windows configured for high power laser transmission. The chamber is hermetically sealed and is one of filled with air, filled with an inert gas, filled with an inert gas mixture, or vacuum pumped. In some cases, the plurality of mirrors is mounted in fixed positions within the chamber. In some instances, the plurality of mirrors is mounted within the chamber using adjustable mounts configured to adjust position, orientation, or a combination of position and orientation of each mirror or each array of mirrors. In some cases, the adjustable mounts include one of MEMS-based adjustable mirror mounts, stepper motor-based adjustable mirror mounts, servomotor-based adjustable mirror mounts, or mechanical adjustable mirror mounts.

In yet another aspect, the technology relates to a telecommunications equipment mounting structure that includes one or more vertical support structures; a plurality of shelves mounted on the one or more vertical support structures; and a free space optical backplane structure mounted on the one or more vertical support structures. The free space optical backplane structure includes a body and a plurality of mirrors. The body includes a chamber, a front panel, and a plurality of apertures disposed in the front panel, the plurality of apertures including a first set of apertures and a second set of apertures. The plurality of mirrors includes a first array of mirrors mounted at a first set of heights within the chamber and a second array of mirrors mounted at a second set of heights within the chamber. The first set of apertures is located in the front panel at the first set of heights and is aligned with the first array of mirrors. The second set of apertures is located in the front panel at the second set of heights and is aligned with the second array of mirrors. The first array of mirrors and the second array of mirrors are arranged to direct laser signals travelling through free space that are transmitted from or to an optical transport mux/demux node: (a) through the first set of apertures, (b) between the first array of mirrors and the second array of mirrors, and (c) to or from at least one optical transponder node through the second set of apertures.

In some examples, the at least one optical transponder node is mounted on at least one first shelf among the plurality of shelves, the optical transport mux/demux node is mounted on a second shelf among the plurality of shelves, and the optical transport mux/demux node. The optical transport mux/demux node includes a hollow core optical fiber interface, a rear panel, a backplane interface, a mux, and a demux. The backplane interface is configured to direct laser signals to or from the at least one optical transponder node via the rear panel and via the free space optical backplane structure. The mux is configured to multiplex multiple sets of laser signals from the at least one optical transponder node via the backplane interface into a single set of laser signals for transmission through a first hollow core optical fiber via the hollow core optical fiber interface. The demux is configured to demultiplex a single set of laser signals received from a second hollow core optical fiber via the hollow core optical fiber interface into multiple sets of laser signals for relay to the at least one optical transponder node via the backplane interface.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A free space optical backplane structure, comprising:
    a body comprising a chamber, a front panel, and a plurality of apertures disposed in the front panel, the plurality of apertures comprising a first set of apertures and a second set of apertures; and
    a plurality of mirrors, comprising:
        a first array of mirrors mounted at a first set of heights within the chamber, wherein the first set of apertures is located in the front panel at the first set of heights and is aligned with the first array of mirrors; and
        a second array of mirrors mounted at a second set of heights within the chamber, wherein the second set of apertures is located in the front panel at the second set of heights and is aligned with the second array of mirrors;
        wherein the first array of mirrors and the second array of mirrors are arranged to direct laser signals travelling through free space that are transmitted from or to a first device:
            (a) through the first set of apertures,
            (b) between the first array of mirrors and the second array of mirrors, and
            (c) to or from a corresponding second device through the second set of apertures.

2. The free space optical backplane structure of claim 1, wherein the laser signals travel horizontally through each of the first set of apertures and the second set of apertures, and wherein the laser signals travel vertically between the first array of mirrors and the second array of mirrors.

3. The free space optical backplane structure of claim 1, wherein the body further comprises a rear panel, a top panel, a bottom panel, and side panels, wherein the chamber is defined by a space enclosed by the front, rear, top, bottom, and side panels.

4. The free space optical backplane structure of claim 3, wherein the plurality of apertures comprises a plurality of openings, wherein the free space optical backplane structure further comprises a plurality of aperture shutters mounted on the front panel, wherein the plurality of aperture shutters is configured to open when the first device and the corresponding second device interface with at least a portion of the free space optical backplane structure, thereby allowing the laser signals to pass through the openings of the apertures, and wherein the plurality of aperture shutters is further configured to close over the plurality of openings when at least one of the first device or the corresponding second device fails to interface with the at least a portion of the free space optical backplane structure.

5. The free space optical backplane structure of claim 4, wherein the free space optical backplane structure further comprises a plurality of interlock switches that causes the plurality of aperture shutters to close over the plurality of openings when the at least one of the first device or the corresponding second device fails to interface with the at least a portion of the free space optical backplane structure.

6. The free space optical backplane structure of claim 5, wherein the first device comprises an optical transport multiplexer/demultiplexer ("mux/demux") node, wherein the second device comprises one or more optical transponder nodes.

7. The free space optical backplane structure of claim 3, wherein the plurality of apertures comprises a plurality of optical windows, wherein the chamber is hermetically sealed.

8. The free space optical backplane structure of claim 7, wherein the plurality of optical windows is configured for high power laser transmission.

9. The free space optical backplane structure of claim 7, wherein the hermetically sealed chamber is one of filled with air, filled with an inert gas, filled with an inert gas mixture, or vacuum pumped.

10. The free space optical backplane structure of claim 1, wherein the plurality of mirrors is mounted in fixed positions within the chamber.

11. The free space optical backplane structure of claim 1, wherein the plurality of mirrors is mounted within the chamber using adjustable mounts configured to adjust position, orientation, or a combination of position and orientation of each mirror or each array of mirrors, wherein the adjustable mounts comprise one of micro-electromechanical system ("MEMS")-based adjustable mirror mounts, stepper motor-based adjustable mirror mounts, servomotor-based adjustable mirror mounts, or mechanical adjustable mirror mounts.

12. The free space optical backplane structure of claim 1, wherein the plurality of mirrors each has a coating comprising at least one of an antireflective coating, a metal coating, a metal alloy coating, a dielectric coating, or a metal-dielectric coating.

13. An optical transport terminal node, comprising:
    at least one optical transponder node;
    an optical transport multiplexer/demultiplexer ("mux/demux") node, comprising:
        a hollow core optical fiber interface;
        a rear panel;
        a backplane interface configured to direct laser signals to or from the at least one optical transponder node via the rear panel and via a free space optical backplane structure;
        a mux configured to multiplex multiple sets of laser signals from the at least one optical transponder node via the backplane interface into a single set of laser signals for transmission through a first hollow core optical fiber via the hollow core optical fiber interface; and
        a demux configured to demultiplex a single set of laser signals received from a second hollow core optical fiber via the hollow core optical fiber interface into multiple sets of laser signals for relay to the at least one optical transponder node via the backplane interface; and
    the free space optical backplane structure, comprising:
        a body comprising a chamber, a front panel, and a plurality of apertures disposed in the front panel, the plurality of apertures comprising a first set of apertures and a second set of apertures; and a plurality of mirrors, comprising:
- a first array of mirrors mounted at a first set of heights within the chamber, wherein the first set of apertures is located in the front panel at the first set of heights, is aligned with the first array of mirrors, and is aligned with the optical transport mux/demux node; and
- a second array of mirrors mounted at a second set of heights within the chamber, wherein the second set of apertures is located in the front panel at the second set of heights, is aligned with the second array of mirrors, and is aligned with the at least one optical transponder node;
- wherein the first array of mirrors and the second array of mirrors are arranged to direct laser signals travelling through free space that are transmitted from or to the optical transport mux/demux node:
  (a) through the first set of apertures,
  (b) between the first array of mirrors and the second array of mirrors, and
  (c) to or from the at least one optical transponder node through the second set of apertures.

14. The optical transport terminal node of claim 13, wherein the optical transport mux/demux node further comprises a first set of transceivers configured to collimate laser signals into the chamber of the free space optical backplane structure when relaying the laser signals from the optical transport mux/demux node to the at least one optical transponder node, wherein the at least one optical transponder node each comprises a second set of transceivers configured to collimate laser signals into the chamber of the free space optical backplane structure when relaying the laser signals from the at least one optical transponder node to the optical transport mux/demux node.

15. The optical transport terminal node of claim 13, wherein the plurality of apertures comprises a plurality of openings, wherein the free space optical backplane structure further comprises a plurality of aperture shutters mounted on the front panel, wherein the plurality of aperture shutters is configured to open when the first device and the corresponding second device interface with at least a portion of the free space optical backplane structure, thereby allowing the laser signals to pass through the openings of the apertures, and wherein the free space optical backplane structure further comprises a plurality of interlock switches that causes the plurality of aperture shutters to close over the plurality of openings when at least one of the first device or the corresponding second device fails to interface with the at least a portion of the free space optical backplane structure.

16. The optical transport terminal node of claim 13, wherein the plurality of apertures comprises a plurality of optical windows configured for high power laser transmission, wherein the chamber is hermetically sealed and is one of filled with air, filled with an inert gas, filled with an inert gas mixture, or vacuum pumped.

17. The optical transport terminal node of claim 13, wherein the plurality of mirrors is mounted in fixed positions within the chamber.

18. The optical transport terminal node of claim 13, wherein the plurality of mirrors is mounted within the chamber using adjustable mounts configured to adjust position, orientation, or a combination of position and orientation of each mirror or each array of mirrors, wherein the adjustable mounts comprise one of micro-electromechanical system ("MEMS")-based adjustable mirror mounts, stepper motor-based adjustable mirror mounts, servomotor-based adjustable mirror mounts, or mechanical adjustable mirror mounts.

19. A telecommunications equipment mounting structure, comprising:
- one or more vertical support structures;
- a plurality of shelves mounted on the one or more vertical support structures;
- a free space optical backplane structure mounted on the one or more vertical support structures, the free space optical backplane structure comprising:
  - a body comprising a chamber, a front panel, and a plurality of apertures disposed in the front panel, the plurality of apertures comprising a first set of apertures and a second set of apertures; and
  - a plurality of mirrors, comprising:
    - a first array of mirrors mounted at a first set of heights within the chamber, wherein the first set of apertures is located in the front panel at the first set of heights and is aligned with the first array of mirrors; and
    - a second array of mirrors mounted at a second set of heights within the chamber, wherein the second set of apertures is located in the front panel at the second set of heights and is aligned with the second array of mirrors;
    - wherein the first array of mirrors and the second array of mirrors are arranged to direct laser signals travelling through free space that are transmitted from or to an optical transport multiplexer/demultiplexer ("mux/demux") node:
      (a) through the first set of apertures,
      (b) between the first array of mirrors and the second array of mirrors, and
      (c) to or from at least one optical transponder node through the second set of apertures.

20. The telecommunications equipment mounting structure of claim 19, wherein:
- the at least one optical transponder node is mounted on at least one first shelf among the plurality of shelves;
- the optical transport mux/demux node is mounted on a second shelf among the plurality of shelves; and
- the optical transport mux/demux node comprises:
  - a hollow core optical fiber interface;
  - a rear panel;
  - a backplane interface configured to direct laser signals to or from the at least one optical transponder node via the rear panel and via the free space optical backplane structure;
  - a mux configured to multiplex multiple sets of laser signals from the at least one optical transponder node via the backplane interface into a single set of laser signals for transmission through a first hollow core optical fiber via the hollow core optical fiber interface; and
  - a demux configured to demultiplex a single set of laser signals received from a second hollow core optical fiber via the hollow core optical fiber interface into multiple sets of laser signals for relay to the at least one optical transponder node via the backplane interface.

* * * * *